Figure 5:
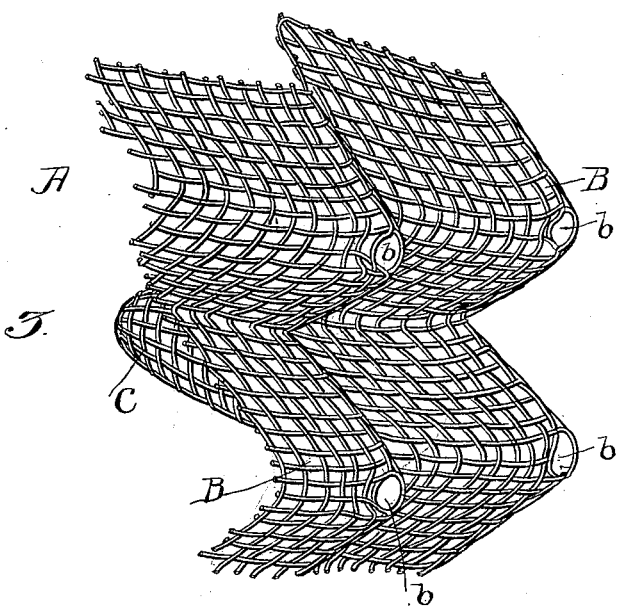

No. 627,588. Patented June 27, 1899.
A. S. MILES.
FLY SCREEN.
(Application filed Aug. 30, 1897.)
(No Model.) 2 Sheets—Sheet 1.
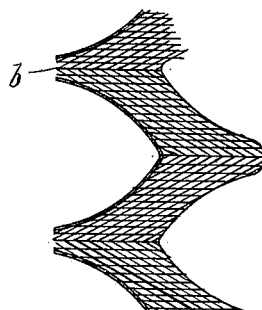
FIG. 1.
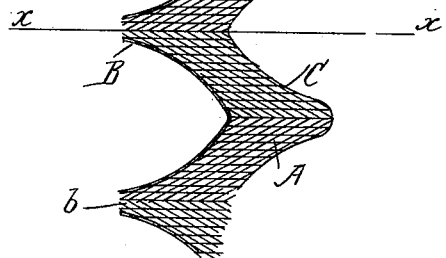
FIG. 2.
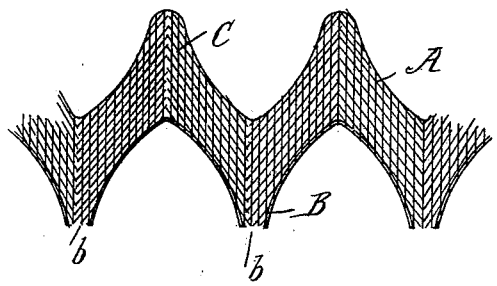
WITNESSES
A. Page
V. Cochue
Annie Sarah Miles
INVENTOR
By Marion & Marion
Attorneys No. 627,588. Patented June 27, 1899.
A. S. MILES.
FLY SCREEN.
(Application filed Aug. 30, 1897.)
(No Model.) 2 Sheets—Sheet 2.

Witnesses:

Annie Sarah Miles Inventor

By Marion & Marion her Attorneys.

UNITED STATES PATENT OFFICE.

ANNIE SARAH MILES, OF OROMOCTO, CANADA.

FLY-SCREEN.

SPECIFICATION forming part of Letters Patent No. 627,588, dated June 27, 1899.

Application filed August 30, 1897. Serial No. 650,032. (No model.)

*To all whom it may concern:*

Be it known that I, ANNIE SARAH MILES, a British subject, residing at Oromocto, in the county of Sunbury, Province of New Brunswick, Canada, have invented certain new and useful Improvements in Fly-Screens, (for which I have obtained Canadian Patent No. 51,577;) and I do hereby declare the following to be a full, clear, and exact description of the invention, such as will enable others skilled in the art to which it appertains to make and use the same.

This invention relates to fly-screens for windows and doors; and it consists in the novel construction of the same, as hereinafter fully described and claimed.

In the drawings, Figure 1 is a cross-section through a portion of the fly-screen. Fig. 2 is a longitudinal section taken on the line $x\ x$ in Fig. 1. Fig. 3 is a perspective view of a portion of the screen.

A is the screen, which is made of wire-gauze.

B is a series of cones molded in the gauze and projecting outwardly on one side of it. These cones have openings $b$ at their apices just large enough for a fly to pass through.

C is a second series of cones, which are molded in the gauze and arranged alternately of the cones B and upon a plane parallel to them.

The cones C have imperforate apices and project rearwardly on the opposite side of the gauze from the cones B. The cones B project outward and the cones C project inward, and they are arranged alternately in rows on the screen.

When a fly alights on the outer surface of the screen, it enters the imperforate cones and is prevented from passing through the screen. When a fly alights on the inner surface of the screen, it passes through the cones B and cannot pass again through the holes $b$. The flies in the cones C outside the screen serve to attract the flies inside the room to come and settle on the screen, so that the room is soon cleared of flies.

What I claim is—

1. A fly-escape having a series of integral cone-shaped projections extending outwardly, each of said projections being provided with an opening at its apex, and also having a series of imperforate integral cone-shaped projections extending inwardly, said inwardly-extending projections being arranged alternately with said outwardly-extending projections, substantially as described.

2. A fly-escape, having integral cone-shaped projections, extending outwardly, said projections being arranged in series vertically and horizontally, and also having integral imperforate cone-shaped projections extending inwardly arranged in series, said series of inwardly-extending projections being arranged alternately with said series of outwardly-extending projections, substantially as described.

In witness whereof I have hereunto set my hand in presence of two witnesses.

ANNIE SARAH MILES.

Witnesses:
 R. M. McLELLAN,
 WESLEY VANWART.